Sept. 17, 1940.    F. MULKA    2,215,107

SCREW FEED MECHANISM

Filed Jan. 14, 1939

INVENTOR
FRIEDRICH MULKA
BY
ATTORNEY

Patented Sept. 17, 1940

2,215,107

UNITED STATES PATENT OFFICE 2,215,107

SCREW FEED MECHANISM

Friedrich Mulka, Dortmund, Germany

Application January 14, 1939, Serial No. 250,869
In Germany December 11, 1937

8 Claims. (Cl. 74—459)

In machine tools it is known to construct the guide spindles and the support spindles as screw feed mechanisms. These spindles have the function of transmitting movement and forces in the direction of the longitudinal axis of the spindle. They are utilised for work involving the removal of coarse chips, e. g. for roughing, as well as for precision work, for example thread cutting. Comparatively large forces are required for the roughing operation and these forces act on the thread of the spindle. In this way the precision work which has to be performed by the spindle is impeded as the thread becomes inaccurate. This applies particularly in the case of unhardened spindles which are used in many cases because the use of hardened spindles is too expenive.

Consequently it has already been proposed to provide a separate spindle for the precision work in addition to the spindle for roughing. In this way more space is required and in addition the machine is rendered more expensive by the second spindle.

In addition threaded spindles are known in which a pointed thread is cut over a flat or trapezoidal thread, the pitch of the pointed thread having any desired relationship to the flat thread. The flat or trapezoidal thread serves in known manner for transmitting a force or movement in the axial direction of the spindle by way of a nut, whereas the auxiliary pointed thread merely supports the spindle by means of a supporting nut and thus prevents it from bending.

According to the present invention a screw feed mechanism provided with a number of nuts is proposed in which each nut engages only with a part of the flank of the thread on the spindle. The individual flank sections may form a continuous surface but preferably the sections are separated by grooves cut in the flank surface or else they are stepped with reference to one another.

In the case of flank sections which are in alignment but are separated by means of a groove, the tooth-form of the nut which engages the outermost flank section is determined only by the choice of the height of the tooth, whereas the tooth-form of the remaining nut or nuts is determined by shaping, e. g. stepping or cutting off the flanks obliquely, and by selecting the height of the tooth.

On the other hand, in the case of stepped flank sections on the spindle, the tooth-form of the nuts is determined only by the choice of the height of the teeth. The nature of the steps, whether rectangular, curved or a combination thereof, is immaterial and is determined in accordance with the magnitude and nature of the forces and movements which are to be transmitted.

In addition the flanks of the thread on the nuts could be stepped to correspond in addition to the stepping of the flanks of the thread on the spindle. With this simultaneous stepping of both threads it is possible for example with a threefold subdivision of the flanks for the outer thread-form to be rectangular, the central thread-form to be trapezoidal and the root thread-form can be rounded. In this way favourable transmission of force is obtained for roughing, intermediate work and finishing.

All the engaging nuts are united to form a group in a bearing housing and positively follow the movement of the nut which is in engagement. Any desired number of such groups of nuts can be mounted on one spindle.

The nuts themselves are made either in two parts or in one piece. In the two-part construction the two halves of the nut may be spaced by means of a lever for example, and in this way be released from the threaded spindle. The threads can interengage without play.

If the nuts are made in one piece then they cannot be released from the thread on the spindle; they must engage with play in the thread on the spindle so that by axial displacement or rotation of the inoperative nuts in their housing these nuts do not contact with either flank of the thread on the spindle, i. e. are idle. In this way the advantage is obtained that the nuts which are idle do not rub against the thread on the spindle nor are they subjected to any pressure. If the engagement and disengagement of the nuts is effected by axial displacement, then the nuts may for example be held in position by adjusting screws, clamping sleeves, couplings and the like. If use is made of rotation of the nut, then a sliding tongue equipped with a cam slot may be provided in a longitudinal groove in the housing for the nuts. A pin mounted on the periphery of the nut slides in this cam slot, so that on displacement of the tongue the pin is moved and the nut is rotated.

By means of the invention not only are the initially described defects avoided but in addition the following advantages are obtained: If, for example, one nut is employed only for coarse preliminary work and a second nut is employed only for the fine finishing work, then coarse work and finishing can be performed simultaneously without introducing inaccuracy into the thread on the spindle as each flank section receives a constant lubrication through the groove which is provided and each has its own separate engagement with a nut.

The subject of the invention can in addition be used for any form of screw feed mechanism which has to transmit forces and movements in the longitudinal direction of the spindle axis. Also the nuts can transmit forces and movements to the spindle by means of rotary movement, as is the case for example in spindle presses, lifting devices and the like.

Four embodiments of the invention are shown by way of example in the accompanying drawing, in which.

Figure 1:
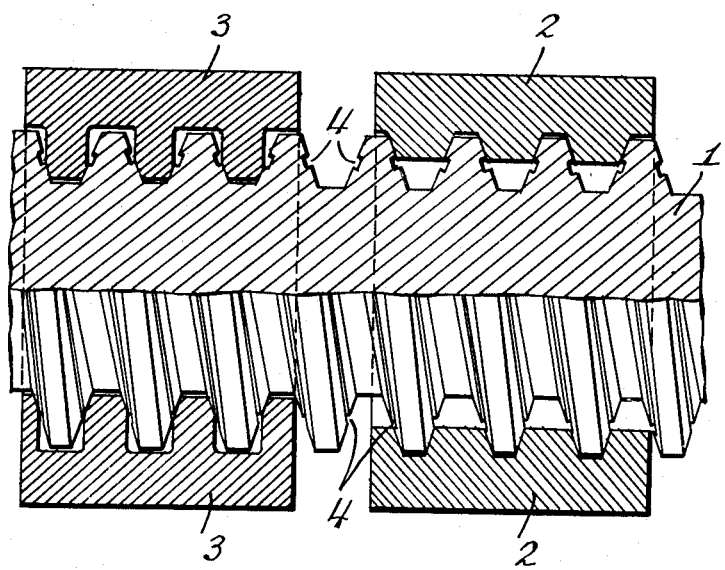
Fig. 1 is a longitudinal cross-section of a first-embodiment.

Figure 1 shows a spindle 1 with a trapezoidal thread in which the aligned flank sections are separated by a rectangular groove 4. These grooves could be of any desired form. They could for example be semicircular, arcuate, square, rectangular or the like. Two two-part nuts 2 and 3 are in engagement with the threaded spindle 1. The nuts are released as previously described.

Figure 2:
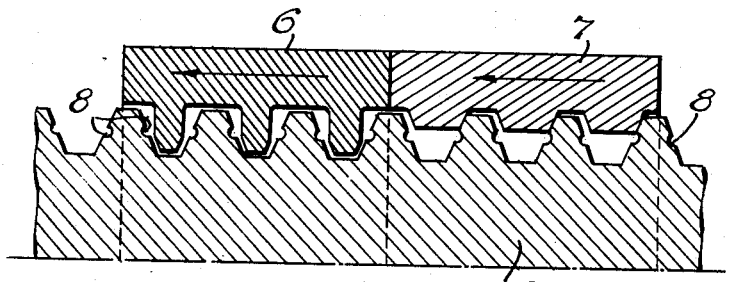
Fig. 2 is a longitudinal cross-section of a second embodiment.

Figure 2 shows a threaded spindle 5 with trapezoidal teeth, in which the flank sections are separated by semicircular grooves. A single part nut 7 is in engagement with the outer flank section of the thread on the spindle 5, whereas the single part nut 6 is idling. The arrows show the direction of movement of the nuts.

Figures 3, 4:
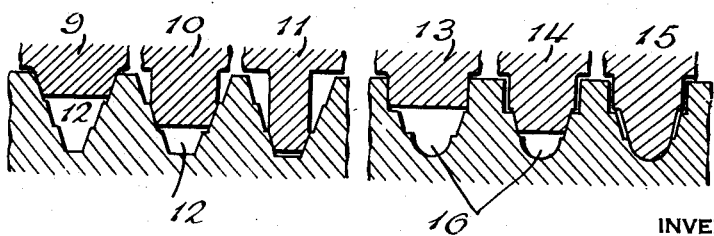
Figs. 3 and 4 are diagrammatic cross-sections of two modified threads respectively.

Figure 3 is a fragmentary view showing stepped trapezoidal teeth 12 on a spindle on which are mounted nuts with teeth 9, 10 and 11 engaging the different steps.

In Figure 4 the thread 16 on the spindle is stepped in such way that the upper part is rectangular, the central part trapezoidal and the lower part is rounded. Nuts with correspondingly stepped teeth 13, 14, 15 engage in this stepped thread 16.

I claim:

1. A screw feed mechanism comprising a threaded spindle, the flanks of the spindle thread being subdivided as to their height into a plurality of different active sections, and as many nuts as there are different active flank sections, the threads of the nuts being shaped so as to cooperate each with one of the different active flank sections respectively.

2. A screw feed mechanism comprising a threaded spindle, the flanks of the spindle thread being subdivided as to their height into a plurality of different active sections separated from each other by grooves, and as many nuts as there are different active flank sections, the threads of the nuts being shaped so as to cooperate each with one of the different active flank sections respectively.

3. A screw feed mechanism comprising a threaded spindle, the flanks of the spindle thread being subdivided as to their height into a plurality of different active sections stepped with respect to each other, and as many nuts as there are different active flank sections, the threads of the nuts being so shaped as to cooperate each with one of said different flank sections respectively.

4. A screw feed mechanism as claimed in claim 1, in which the contours of said different active sections of the same flank are parallel to each other.

5. A screw feed mechanism as claimed in claim 1 in which the contours of said different active sections of the same flank are differently shaped.

6. A screw feed mechanism comprising a threaded spindle, the flanks of the spindle thread being subdivided as to their height into a plurality of different active sections, and as many nuts as there are different active flank sections, the threads of the nuts being so shaped as to cooperate each with one of said different flank sections respectively, the height of the flank of each nut thread being equal to the height of its cooperating portion plus the height measured from the root circle to the coordinate flank sections.

7. A screw feed mechanism as claimed in claim 1 in which the flanks of the thread of at least one of said nuts are step-shaped.

8. A screw feed mechanism as claimed in claim 1 in which the mating convolutions of the thread of at least one of the nuts is narrower than the corresponding thread groove portion of the spindle so as to provide a lateral play between the spindle and said nut.

FRIEDRICH MULKA.